Nov. 8, 1949 A. E. STRANG 2,487,395
VACUUM CLEANER CORD RETRIEVER
Filed May 29, 1946 2 Sheets-Sheet 1

INVENTOR.
*Alvin E. Strang*
BY *Frease and Bishop*
ATTORNEYS

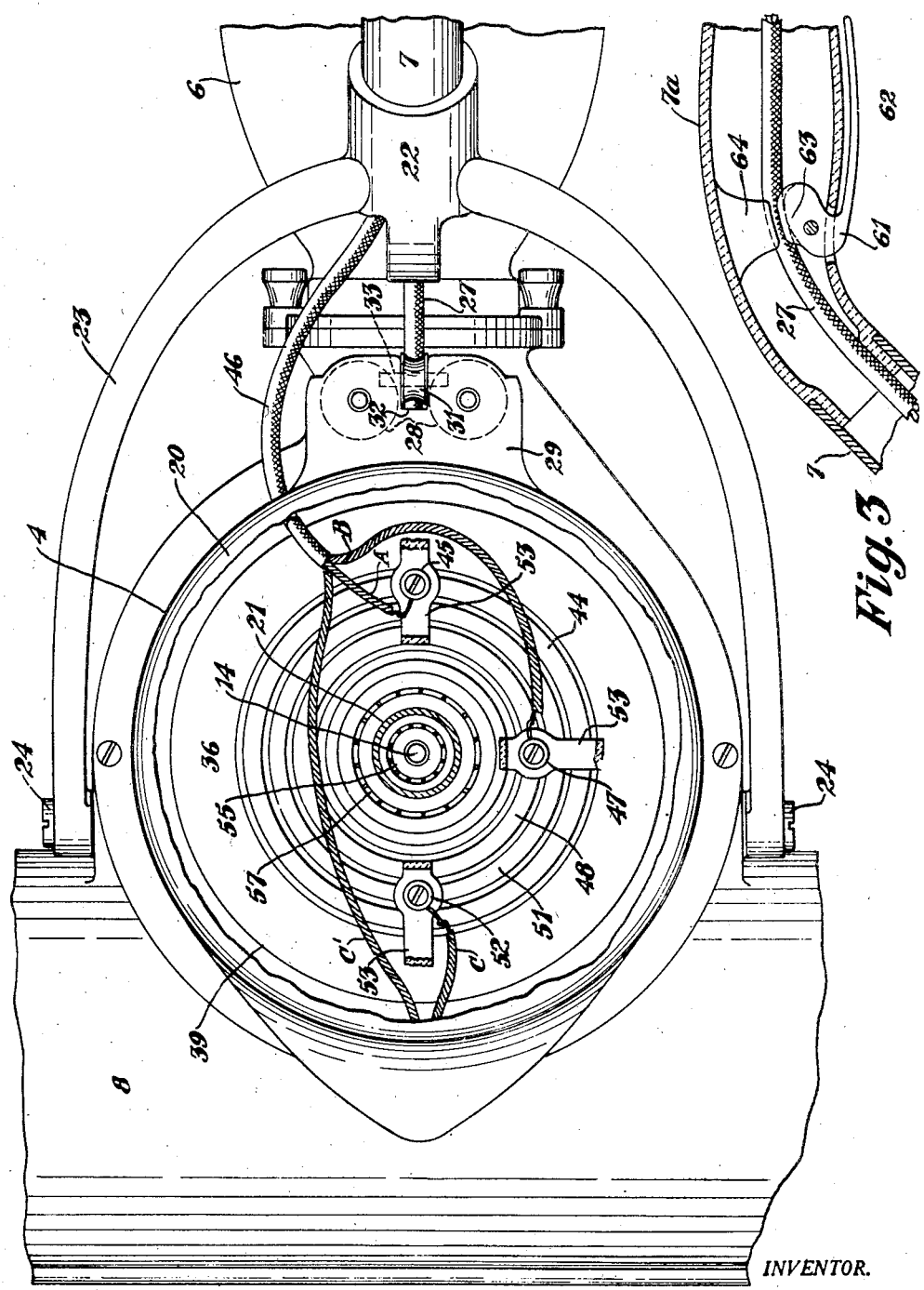

Patented Nov. 8, 1949

2,487,395

UNITED STATES PATENT OFFICE 2,487,395

VACUUM CLEANER CORD RETRIEVER

Alvin E. Strang, Canton, Ohio, assignor of forty-nine one-hundredths to Charles A. Mentges, Canton, Ohio Application May 29, 1946, Serial No. 673,097

3 Claims. (Cl. 191—12)

1

The invention relates generally to a retriever or take-up for the conductor cord for a portable vacuum cleaner, so that when a considerable length of the cord is payed out during operation of the cleaner, the cord automatically may be retrieved or wound up within the vacuum cleaner as it is moved toward the power supply connection.

Prior take-up constructions have included spring driven reels mounted on the vacuum cleaner, but these reels have been relatively heavy and bulky, and have also detracted from the appearance of the cleaner. In the U. S. Patent to S. T. and A. E. Strang, No. 2,016,935, dated October 8, 1935, there is disclosed a cord retriever in which the cord is wound back and forth over a series of pulleys within the handle. While this construction has certain advantages, it requires a complicated system of pulleys within a handle of relatively large diameter, and it is necessary to provide a spring driven reel for imposing tension between the pulley blocks in opposite ends of the handle.

It is an object of the present invention to provide a cord retriever construction which may be incorporated in a vacuum cleaner without materially increasing the size of the housing or the size of the handle.

Another object is to provide an improved cord retriever, which does not require a spring driven reel, but which utilizes the reaction or torque on the motor housing to wind up the cord when desired.

A further object is to provide a novel and improved cord retriever construction which is simple and inexpensive to construct, and includes a reel adapted for being embodied in the motor housing of a standard vacuum cleaner so as to carry surplus cord around the motor.

A still further object is to provide a novel and improved cord retriever which will overcome the disadvantages of prior constructions, and which will store a substantial length of conductor cord in wound-up condition.

These and other objects are accomplished by the parts, elements, constructions, arrangements, and combinations which comprise the present invention, the nature of which is set forth in the following general statement, a preferred embodiment of which is set forth in the following description and illustrated in the accompanying drawings, and which is particularly and distinctly pointed out and set forth in the appended claims forming part hereof.

In general terms, the improvements comprising the present invention may be stated as including a vacuum cleaner having the conductor cord passing through a hollow handle and into the cleaner housing where it is wound around a reel surface on the outside of the motor housing, the motor housing being journaled in the vacuum cleaner housing for rotation relative to the armature shaft, means in the handle for clamping the conductor cord, and there being exterior contact rings on the end of said motor housing for providing current connections between the motor circuit and a headlight and a switch located in the handle.

Referring to the drawings forming part hereof in which a preferred embodiment of the invention is shown by way of example;

Fig. 2 is a fragmentary plan view thereof, parts being broken away and in section; and Fig. 3 is a fragmentary sectional view of the upper end of the handle, showing the clamp for holding the conductor cord.

Similar numerals refer to similar parts throughout the several views of the drawings.

Figure 1:
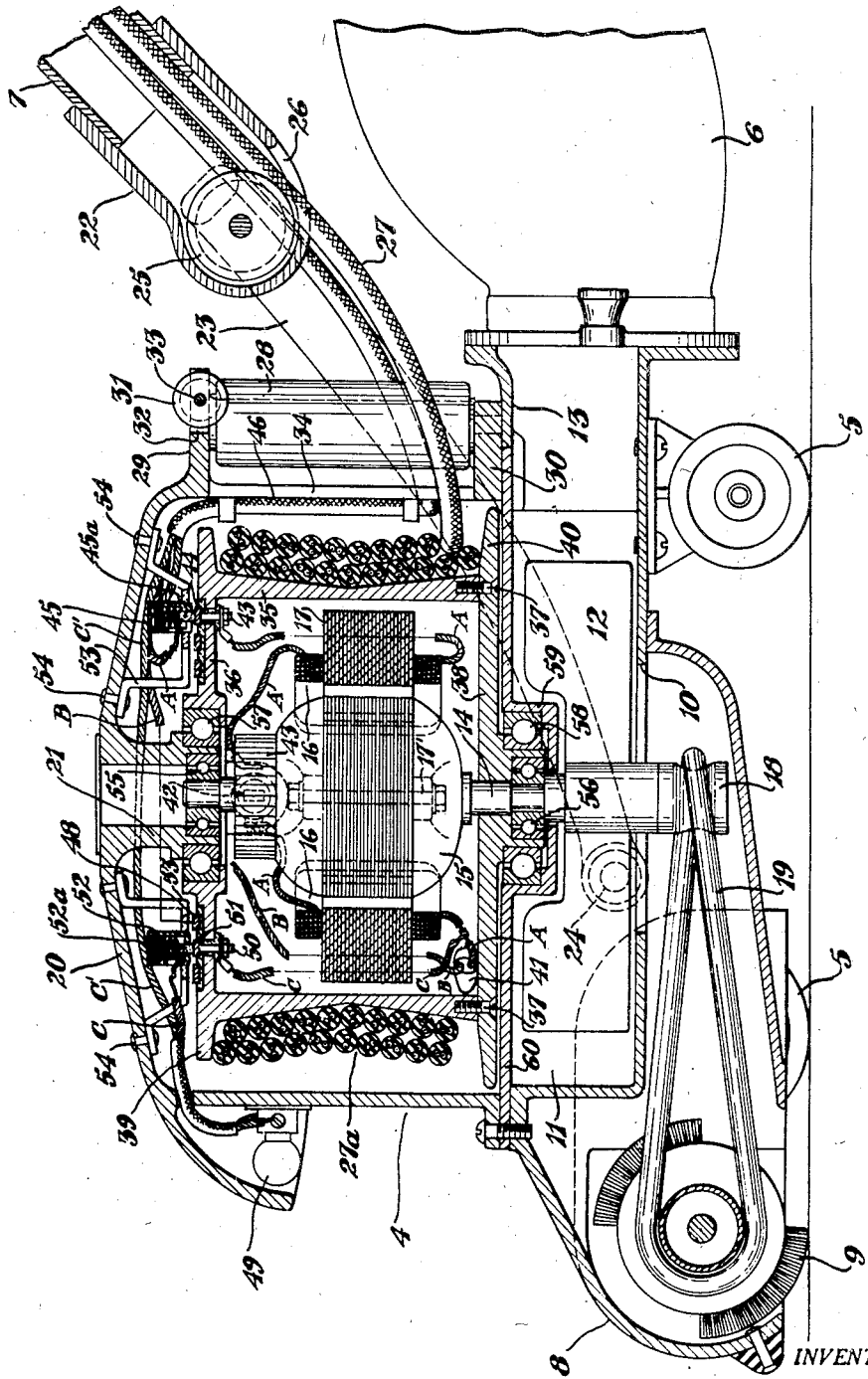
Figure 1 is a transverse sectional view through the housing of a vacuum cleaner embodying the invention, the suction bag and handle being shown fragmentarily.

The vacuum cleaner which is shown in the drawings is preferably a typical standard vacuum cleaner adapted for household use, and consists generally of casing 4, which is mounted on wheels or rollers 5, and a suction bag 6 and handle 7.

The casing 4 has a nozzle portion 8 which may enclose a rotary brush 9, and the nozzle communicates through an intake port 10 with a fan chamber 11 in which a suction fan 12 is rotatably mounted. The fan chamber communicates through an exhaust port 13 with the suction bag 6 in a usual fashion, and the fan 12 is secured on the armature shaft 14 of a driving motor having its armature 15 rotatable within the field coils 16 and core 17.

As shown, the lower end of the armature shaft 14 may have a pulley 18 thereon for rotatably engaging the belt 19 which drives the rotary brush 9 in the nozzle. The upper end of the casing 4 is in the form of a dome-shaped hood 20 surrounding the driving motor, and a tubular bearing portion 21 depends from the central portion of the hood 20 coaxial with the armature shaft 14 of the motor, for mounting the upper end of said shaft.

The handle 7 is preferably tubular as shown and is telescoped at its lower end into a fitting 22 which is secured to the handle bail 23, the lower ends of which are pivotally mounted at 24 to opposite sides of the casing 4. The upper end of the handle is preferably provided with a suitable hand grip portion 7a, as shown in Fig. 3.

Preferably the fitting 22 has a pulley 25 journaled in its lower end, and is provided with a slot 26 through which the conductor cord 27 passes, the cord being led from the driving motor over the pulley 25 through the handle, and thence to the power supply connection, which may be a usual electric socket or receptacle. The conductor cord 27 passes from the opening 26 in the fitting 22 into the casing 4 preferably between a pair of vertical rollers 28 which are journaled in suitable brackets 29 and 30 at the rear side of the casing 4, and these rollers 28 have substantial height so that they will rollably engage the cord 27 as the handle 7 is raised or lowered to a substantial extent. Preferably, a vertical pulley 31 is located in a slot 32 formed in the bracket 29 between the upper ends of the rollers 28, and the pulley is journaled on a shaft 33 mounted in the bracket 29 so that when the handle 7 is raised to a position approaching vertical, the cord 27 will be rollably engaged by the pulley 31 and thus maintained between the rollers 28.

From the rollers 28, the cord 27 passes into the casing 4 through a slot 34 and is wound around the outside of the motor housing as indicated in Fig. 1. The motor housing is formed to have an annular reel portion 35 extending downwardly from its upper end wall 36, and preferably detachably connected as by screws 37 to a lower end wall 38. Preferably, the upper end wall extends radially outward beyond the reel portion 35 to form the annular flange 39, and the lower end wall extends radially outwardly beyond the portion 35 to form the annular flange 40, thus providing a channel-shaped outer surface on the motor housing for receiving the wound-up turns of the conductor cord 27 thereon.

The conductor cord 27 passes from the slot 34 around the reel portion 35, and the opposite end of the cord is led into the motor housing through an opening 41 for making electrical connection with the motor. One of the leads A from the conductor cord is connected to an adjacent field coil 16 which is in turn connected by the conductor A to a conventional carbon brush 42 contacting the commutator 43, the opposite brush (not shown) being connected by another lead A to the other field coil in series. From the last field coil 16 the lead A is connected through a terminal 43 to an outer contact ring 44 on the top of the end wall 36 of the motor housing. Means providing a sliding contact or current take-off contacting ring 44 preferably includes a brush holder 45 mounting spring pressed brush 45a to which is connected a lead A which passes into a conductor cord 46 passing into and through the handle 7 to a suitable switch (not shown) preferably located near the upper end of the handle and adapted for closing or opening the circuit to the motor.

The returning lead from the switch is shown at B leaving the conductor cord 46 and is connected to a brush similar to the brush 45a and mounted in a brush holder 47 in sliding contact with an inner contact ring 48 concentric with the ring 44. From a terminal similar to terminal 43 and connected to the contact ring 48, a lead B is connected to the lead B of the conductor cord 27 where it enters the motor housing through slot 41, thus completing the circuit.

A parallel circuit for connecting a headlight 49 or other accessory may be provided by connecting a lead C to the lead A just inside the opening 41, and connecting the lead C to a terminal 50 which connects through the end wall 36 of the motor housing with a middle concentric contact ring 51. A brush 52a in a brush holder 52 provides a sliding contact with the ring 51 and a lead C connects the brush in series with the light bulb 49, from which another lead C' passes into the conductor cord 46 and up through the handle to connect to the switch controlling the motor circuit or to a separate switch if desired.

The brush holders 45, 47 and 52 are each mounted on the underside of the hood 20 by means of substantially U-shaped brackets 53, the upper ends of which are secured to the hood by means of rivets or the like 54. The carbon brushes in the holders are suitably insulated therefrom, and the contact rings 44, 48 and 51, and the terminals connected therewith, are suitably insulated from the end wall 36 of the motor housing.

The armature shaft 14 is journaled at its upper and lower ends in ball bearings 55 and 56 respectively, the outer race of the bearing 55 being mounted in the depending annular flange 21 of the hood, and the outer race of the bearing 56 being mounted in the lower end plate 38 of the motor housing. The upper end wall 36 of the motor housing is journaled by means of ball bearings 57, on the depending annular flange 21 of the hood, and the lower end wall 38 is journaled by means of ball bearings 58 in a depending portion 59 on the top wall 60 of the fan chamber 11.

Accordingly, the armature 15 of the motor is rotatable with respect to the casing 4 of the cleaner, and the motor housing formed by the walls 35, 36 and 38 is rotatable in the casing relative to the armature. Thus, when the armature of the motor is rotating, the torque developed thereby will tend to rotate the motor housing in the opposite direction, and with it the field coils 16 and the core 17, which is mounted on the annular wall 35 preferably by bolts 17', one of which is shown in dotted lines in Fig. 1.

An intermediate portion of the conductor cord 27 is wound around the reel 35 constituting the motor housing as shown at 27a in a direction such that the relative rotation of the motor housing due to torque will wind the cord 27 around the motor housing unless the housing is held stationary. Holding the housing stationary is preferably accomplished by means of a friction clamp 61 mounted in the hand grip portion 7a of the handle for engaging the cord 27 passing therethrough. The clamp 61 preferably has a handle 62 located exteriorly of the hand grip portion 7a, and an inner cam-shaped portion 63 which is adapted to clamp the cord 27 against a projection 64 in the hand grip for preventing linear movement of the cord.

In the operation of the vacuum cleaner embodying the novel cord retriever, the cord is payed out by releasing the clamp 61 and pulling the cord 27 out of the handle as the cleaner is moved about from place to place. If the motor is operating, the cord 27 must be pulled out against the torque tending to rotate the motor housing and wind up the cord thereon. As the cleaner is moved toward the power supply connection and creates slack in the cord which has been payed out, this slack may be immediately taken up by momentarily releasing the clamp 61, whereupon the torque will rotate the motor housing and wind the cord 27 thereon until the clamp 61 is again engaged with the cord.

The present improved cord retriever provides a cord take-up for a vacuum cleaner without increasing the size of the cleaner housing or the handle, and without requiring a spring driven reel. Moreover, the present improvements overcome the disadvantages of prior constructions in storing a substantial length of conductor cord around the motor housing, and in providing a simple and inexpensive construction which is easily adapted to a standard type of vacuum cleaner.

While the improved cord retriever has been shown and described as embodied in a portable vacuum cleaner, it is apparent that it may be embodied in other portable electric appliances without departing from the scope of the invention as defined in the appended claims.

It is to be understood that the embodiment of the improved construction illustrated and described herein is by way of example, and the scope of the present invention is not limited to the exact details of construction.

Having now described the invention, the construction, operation and use of a preferred embodiment thereof, and the advantageous, new and useful results obtained thereby; the new and useful constructions and reasonable mechanical equivalents thereof obvious to those skilled in the art, are set forth in the appended claims.

I claim:

1. In a vacuum cleaner including an electric motor having a housing and an armature, a handle, and a conductor cord leading from the handle to said motor, a cord reel surface on the exterior of the motor housing for storing an intermediate portion of the cord between the handle and motor, means journaling the motor housing in said cleaner for rotation relative to the armature, means journaling the armature in said motor housing, a fan driven by said armature, said intermediate portion of the cord being wound on said reel surface in the opposite direction from the direction of rotation of the armature so as to be wound up by the torque reaction of the armature in operation, contact rings on the motor housing, means electrically connecting the motor to said rings, brush means slidably engaging said rings for providing current connections with the motor circuit, and means on the handle for holding said cord against linear movement.

2. A cord retriever for a portable electric appliance having a conductor cord for connection to a power supply, including a motor having a housing journaled in the appliance, said housing having an exterior cord-winding surface for storing an intermediate portion of said conductor cord, an armature journaled in said motor housing for rotation relative to said housing and said appliance, a rotary element driven by said armature, contact means on said housing providing sliding current connections with the motor circuit, means electrically connecting said motor to said contact means, and means for clamping said cord against linear movement, the cord being wrapped around said cord-winding surface in the opposite direction from the direction of rotation of the motor armature so as to be retrieved by the torque of the motor.

3. A cord retriever for a portable electric appliance having a conductor cord for connection to a power supply, including a motor having a housing journaled in the appliance, said housing having an exterior cord-winding surface for storing an intermediate portion of said conductor cord, an armature journaled in said motor housing for rotation relative to said housing and said appliance, a rotary element driven by said armature, contact rings on the exterior of said motor housing, means electrically connecting said motor to said contact rings, brush means slidably engaging said contact rings for providing current connections with the motor circuit, and means for clamping said cord against linear movement, the cord being wrapped around the cord-winding surface of said motor housing in a direction opposite to the direction of the torque of the armature so that the relative rotation of the housing and armature in operation will tend to take up the cord.

ALVIN E. STRANG.

REFERENCES CITED

The following references are of record in the file of this patent:

UNITED STATES PATENTS

| Number | Name | Date |
| --- | --- | --- |
| 1,058,635 | Sessions | Apr. 8, 1913 |
| 1,132,740 | Sessions et al. | Mar. 23, 1915 |
| 2,012,208 | Wildy | Aug. 20, 1935 |
| 2,126,470 | Johnson | Aug. 9, 1938 |
| 2,246,862 | Smellie | June 24, 1941 |
| 2,246,863 | Smellie | June 24, 1941 |